(12) United States Patent
Blanchard

(10) Patent No.: US 7,555,968 B2
(45) Date of Patent: Jul. 7, 2009

(54) TRANSMISSION DEVICE BETWEEN A PRIMARY DRIVE SHAFT AND AN OUTPUT SHAFT AND A VEHICLE EQUIPPED WITH SUCH A DEVICE

(75) Inventor: Robert Blanchard, Le Boupere (FR)

(73) Assignee: France Reducteurs, Les Herbiers (FR)

( * ) Notice: Subject to any disclaimer, the term of this patent is extended or adjusted under 35 U.S.C. 154(b) by 396 days.

(21) Appl. No.: 11/494,629

(22) Filed: Jul. 28, 2006

(65) Prior Publication Data
US 2007/0022834 A1    Feb. 1, 2007

(30) Foreign Application Priority Data
Jul. 29, 2005    (FR)    ................... 05 08096

(51) Int. Cl.
*F16H 1/02*    (2006.01)
(52) U.S. Cl. ............... 74/342; 74/351; 192/20
(58) Field of Classification Search ............ 192/20, 192/69.81, 99 S; 74/342, 351, 355
See application file for complete search history.

(56) References Cited

U.S. PATENT DOCUMENTS 44,124 A * 9/1864 Sweet ............... 192/20
1,419,247 A * 6/1922 George ............... 74/665 H
2,047,392 A * 7/1936 Steele ............... 244/102 R
2,377,575 A * 6/1945 Ringer ............... 192/48.9
2,722,281 A * 11/1955 Falkenberg ............... 180/19.1
3,563,353 A * 2/1971 LoPresti et al. ............... 192/21
7,306,216 B2 * 12/2007 Lee et al. ............... 271/10.01

FOREIGN PATENT DOCUMENTS

DE    101 62 561 A1    7/2003
EP    0 870 621 A    10/1998
EP    1 529 702 A    5/2005

* cited by examiner

*Primary Examiner*—Sherry Estremsky
(74) *Attorney, Agent, or Firm*—Young & Thompson

(57) ABSTRACT

A transmission device between a primary drive shaft and an output shaft includes a housing inside of which is housed at least partially a reduction gear mechanism that consists of an engine-driving element, meshed with a driven element, adapted to be coupled to or uncoupled from the output shaft by a clutch mechanism that is activated/deactivated by axial movement of the gearwheel on the shaft. The clutch mechanism, retracted to the disengaged position, assumes the shape of a plate that is integral in rotation with the output shaft. The plate has on its face opposite the gearwheel, ramps designed to work during the engagement phase with ramps that are supported by the gearwheel.

4 Claims, 2 Drawing Sheets

TRANSMISSION DEVICE BETWEEN A PRIMARY DRIVE SHAFT AND AN OUTPUT SHAFT AND A VEHICLE EQUIPPED WITH SUCH A DEVICE

BACKGROUND OF THE INVENTION

This invention relates to a transmission device between a primary drive shaft and an output shaft, such as a wheel drive shaft, of an automotive machine, such as a lawnmower, of the type comprising a housing inside of which is housed at least partially a reduction gear mechanism that consists of an engine-driving element, such as an endless screw, meshed with a driven element, such as a gearwheel, whereby the driven element is likely to be coupled to or uncoupled from said output shaft by means of a clutch mechanism that is activated/deactivated by axial movement of the gearwheel on the shaft, this movement being controlled by an actuating element that can be moved angularly, such as a fork, as well as a vehicle that is equipped with such a transmission device.

DESCRIPTION OF THE RELATED ART

For many years, transmission devices of the above-mentioned type, applied in particular to lawnmowers, were housed inside a housing, a friction clutch mechanism, in particular with cones. The clutch control was obtained with a fork bringing the cones into contact with an internal tooth bearing of the gearwheel. More recently, transmissions in which the gearwheel from now on can be moved axially on the output shaft have appeared on the market. This gearwheel is equipped on one of its faces with ramps that work with the branches of a pin that is integral in rotation with the shaft. The drawback of such a solution resides in a rapid wear of the gearwheel ramps, which makes it necessary to change the gearwheel frequently.

Transmissions of torque limiter type integrating a gearwheel with axial movement as, in particular, Patent EP-0,870, 621 illustrates are also known. In this case, the gearwheel is, by means of a spring, retracted to an engaged position of the output shaft which, when an obstacle is encountered, allows a disengagement of the transmission. Such a solution, in which the transmission is in normal engaged position, the disengagement being performed when a resistance greater than a predetermined value is exerted on the output shaft, is not a solution that can be transferred to an automotive vehicle of lawnmower type where it is vital, for safety reasons, that the transmission be in the disengaged position unless there is control input from a driver.

SUMMARY OF THE INVENTION

One object of this invention is therefore to propose a transmission device whose design produces neither premature wear of parts nor increase of the space requirement relative to a traditional transmission device.

For this purpose, the invention has as its object a transmission device between a primary drive shaft and an output shaft, such as a wheel drive shaft, of an automotive machine, such as lawnmowers, of the type comprising a housing inside of which is housed at least partially a reduction gear mechanism that consists of an engine-driving element, such as an endless screw, meshed with a driven element, such as a gearwheel, whereby the driven element is likely to be coupled to or uncoupled from said output shaft by means of a clutch mechanism that is activated/deactivated by axial movement of the gearwheel on the shaft, characterized in that the clutch mechanism, retracted to the disengaged position, assumes the shape of a plate that is integral in rotation with the output shaft, this clutch cover plate being equipped, on its face opposite the gearwheel, with ramps designed to work during the engagement phase with ramps supported by the gearwheel, the engagement being obtained by axial movement controlled by the gearwheel on the shaft in the direction in which the gearwheel moves toward said plate, this movement being controlled by an actuating element with manual control that preferably can be moved angularly, such as a fork.

The engagement from now on being obtained by working with ramps, the absence of premature wear of the unit is noted.

According to a preferred embodiment of the invention, the actuating element is, unless there is control input from an operator, retracted to the inactive position corresponding to the disengaged position of the clutch mechanism, and there is provided, inserted between the clutch cover plate and gearwheel, a spring that tends to retract the gearwheel into a position away from the corresponding plate to a disengaged position.

The invention also has as its object an automotive wheeled vehicle, such as a lawnmower, characterized in that it is equipped with a transmission device of the above-mentioned type.

The transmission is designed to be inserted between the primary drive shaft and the wheel drive shaft of the vehicle.

BRIEF DESCRIPTION OF THE DRAWINGS

The invention will be well understood from reading the following description of embodiments, with reference to the accompanying drawings in which.

DETAILED DESCRIPTION OF THE PREFERRED EMBODIMENTS

Figure 1:
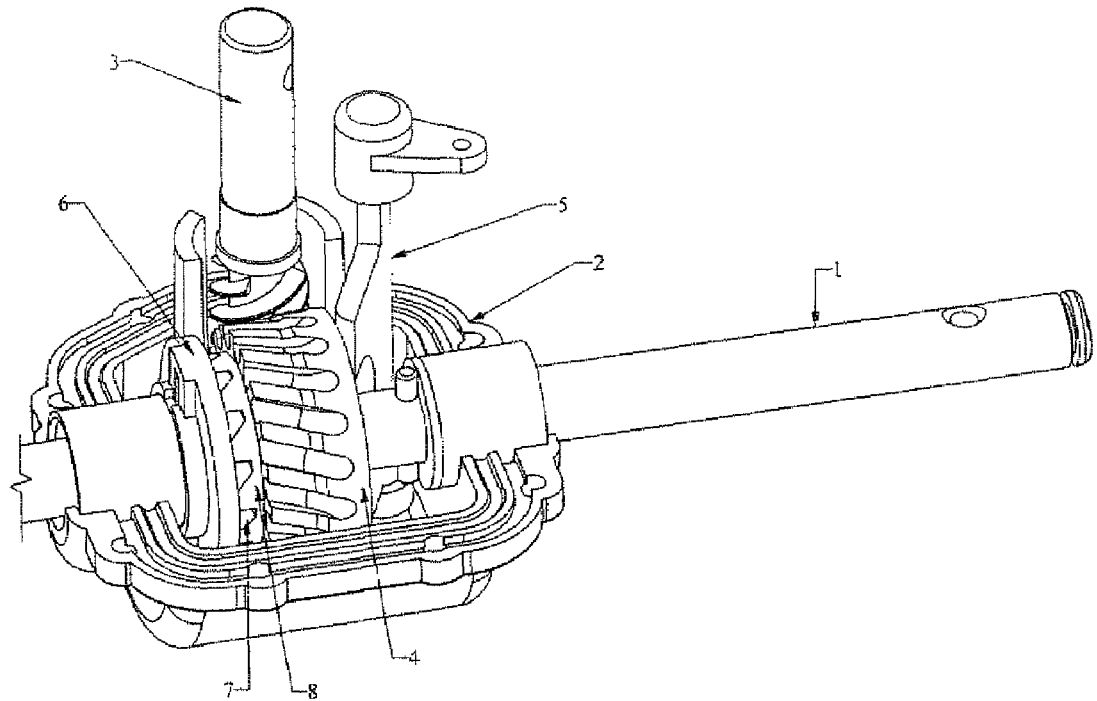
FIG. 1 represents a partial perspective view of a transmission device in the open state of the housing in engaged position of the clutch mechanism.
Figure 2:
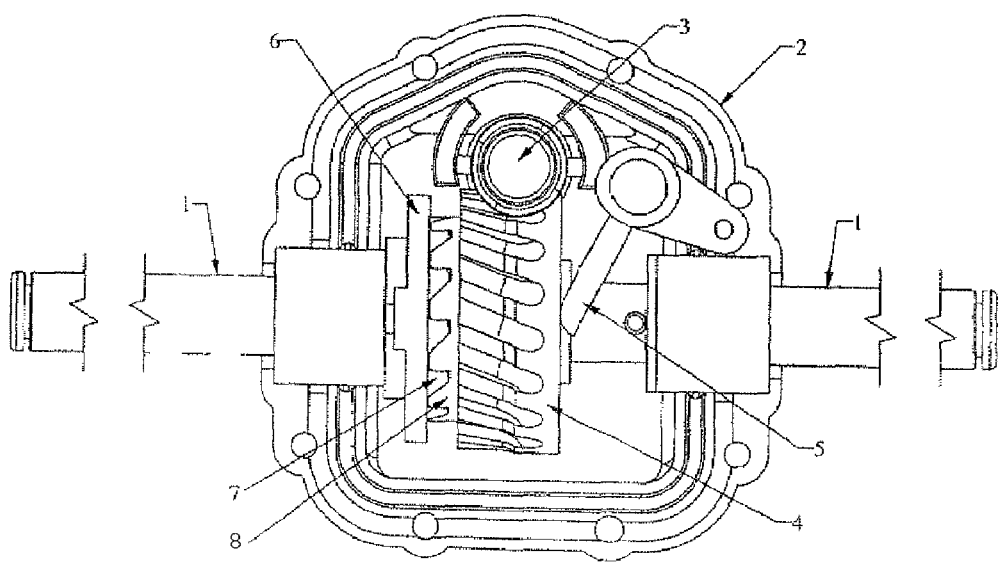
FIG. 2 represents a top view of the housing of FIG. 1.
Figure 3:
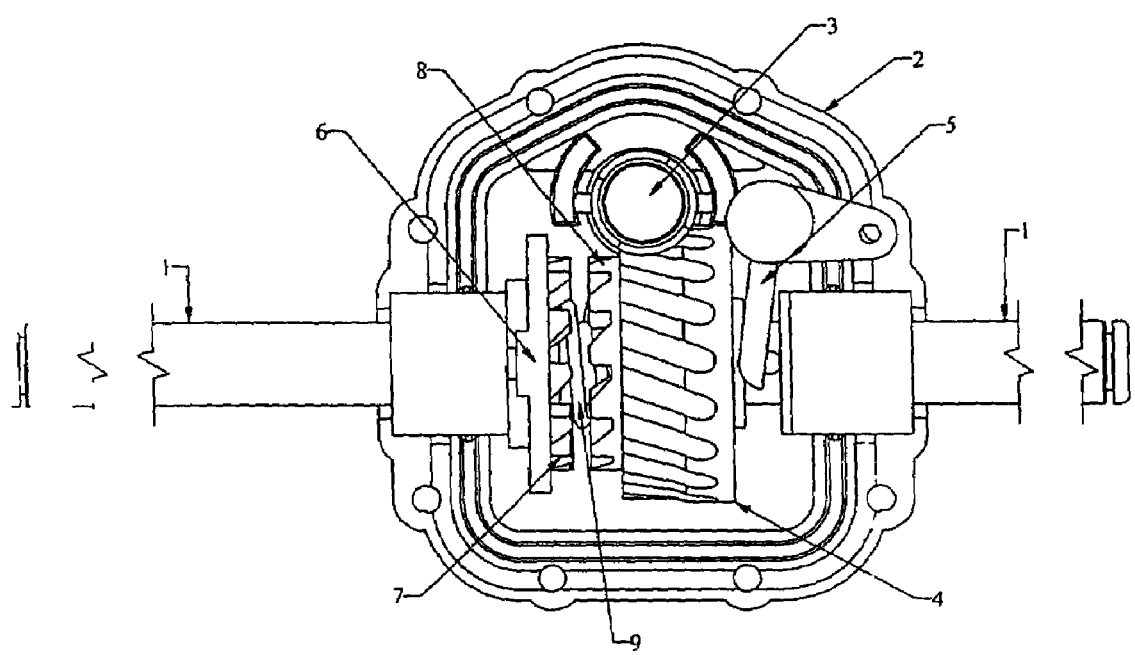
FIG. 3 represents a top view of the housing of FIG. 1 in the non-engaged state.

As mentioned above, the transmission device between a primary drive shaft and an output shaft 1 applies more particularly to automotive machines or vehicles, such as lawnmowers. Such lawnmowers comprise a blade-holder engine output shaft generally connected by a belt transmission to an input shaft of a reduction gear mechanism, itself housed inside a housing 2. This reduction gear mechanism consists of an engine-driving element 3, such as an endless screw, meshed with a driven element 4, such as a tangential gearwheel. This gearwheel 4 is mounted coaxially to the output shaft 1, whereby this shaft constitutes a wheel drive shaft of the vehicle. The driven element 4 or the gearwheel is likely to be coupled to or uncoupled from said output shaft 1 by means of a clutch mechanism. This clutch mechanism is activated, or respectively deactivated, by axial movement of the gearwheel 4 on the output shaft 1. This movement is controlled by an actuating element with manual control that can be moved angularly, such as a fork 5. This fork is positioned inside the housing and projects at least partially from the latter, in particular to be able to be moved angularly by means of an operator-actuated cable control. This fork-type actuating element with manual control, mobile between an active position and an inactive position, is retracted to the inactive position corresponding to the disengaged position of the clutch mechanism.

In a manner characteristic of the invention, the clutch mechanism assumes the shape of a plate 6 that is integral in rotation with the output shaft 1. This clutch cover plate 6 is provided, on its face opposite the gearwheel 4, with ramps 7. These ramps 7 thus form a circular serration on the face of the plate 6 opposite the gearwheel 4. These ramps 7 are designed to work with ramps 8 that are supported by the gearwheel 4 during the engagement phase. Again, the ramps 8 that are supported by the gearwheel 4 assume the shape of a circular serration that is positioned on the face of the gearwheel 4 opposite the plate 6. These ramps 7, 8 are interlocked during the engagement phase that is obtained by controlled axial movement of the gearwheel 4 on the shaft 1, in the direction in which the gearwheel 4 moves toward said plate 6. The movement of driving gearwheel 4 in rotation is then transmitted to the plate 6 that is integral in rotation with the output shaft 1 and, consequently, with the output shaft 1 that drives the wheels of the vehicle.

The disengagement is obtained during a release of the fork by separation of the gearwheel 4 from the plate 6. Actually, the fork is retracted into the inactive position by retraction means such as a spring. The ramps 7, 8 that are supported respectively by the plate 6 and the gearwheel 4 are no longer interlocked such that the gearwheel 4 continues to be driven in rotation by the endless screw 3 without action on the plate 6 and consequently without action on the output shaft 1.

To facilitate this disengagement, there is also provided, inserted between clutch cover plate 6 and gearwheel 4, a spring 9 that tends to retract the gearwheel 4 into a position away from the plate 6 corresponding to a disengaged position. This spring 9 assumes the shape of a helicoidal spring wound around said output shaft 1.

The operation of such a transmission device is therefore extremely simple. During the driving in rotation of the drive shaft of the machine, the rotary movement of this endless screw 3 is transmitted to the tangential gearwheel 4. This tangential gearwheel 4 can be moved axially over the output shaft 1 on which it is mounted to rotate freely via the fork 5 that acts by resting on the face of the gearwheel 4 opposite to the one that supports the ramps 7. The fork 5 thus moves the gearwheel 4 axially over the shaft 1 until the ramps 8 of the wheel 4 are interlocked with the ramps 7 of the plate 6 that is integral in rotation with the shaft 1. The shaft 1 is then driven in rotation. The disengagement is performed by simple release of the fork 5 allowing an axial movement in opposite direction of the gearwheel 4. The spring 9 assists in this movement.

The invention claimed is:

1. Transmission device between a primary drive shaft and an output shaft (1), comprising:
    a reduction gear mechanism;
    a clutch mechanism;
    a housing (2) at least partially housing the reduction gear mechanism,
    the reduction gear mechanism comprising an engine-driving element (3) meshed with a driven element (4), the driven element (4) being configured to be coupled to and uncoupled from said output shaft (1) by the clutch mechanism activated/deactivated by axial movement of the driven element (4) on the output shaft,
    wherein the clutch mechanism, when retracted to the disengaged position, assumes the shape of a clutch cover plate (6) that is integral in rotation with the output shaft (1), the clutch cover plate (6) being provided, on a face opposite the driven element (4), with ramps designed to work during an engagement phase with ramps supported by the driven element (4), whereby this engagement is obtained by axial movement of the driven element (4) on the shaft (1) in the direction in which the driven element (4) moves toward said clutch cover plate (6), whereby the axial movement is controlled by an actuating element with manual control, and
    wherein the actuating element is, unless there is control input from a driver, retracted to an inactive position corresponding to the disengaged position of the clutch mechanism and wherein there is provided, inserted between clutch cover plate (6) and driven element (4), a spring (9) that tends to retract the driven element (4) into a position away from the clutch cover plate (6) that corresponds to a disengaged position.

2. Transmission device according to claim 1, wherein the spring (9) assumes the shape of a helicoidal spring wound around said output shaft (1).

3. Automotive wheeled vehicle, such as a lawnmower, wherein it is equipped with a transmission device according to claim 1.

4. Transmission device between a primary drive shaft and an output shaft (1), the output shaft being a wheel drive shaft of a lawnmower, comprising:
    a reduction gear mechanism;
    a clutch mechanism;
    a housing (2) at least partially housing the reduction gear mechanism,
    the reduction gear mechanism comprising an engine-driving element (3), the engine-driving element being an endless screw meshed with a driven element (4), the driven element being a gearwheel, the driven element (4) being configured to be coupled to and uncoupled from said output shaft (1) by the clutch mechanism activated/deactivated by axial movement of the driven element (4) on the output shaft,
    wherein the clutch mechanism, when retracted to the disengaged position, assumes the shape of a clutch cover plate (6) that is integral in rotation with the output shaft (1), the clutch cover plate (6) being provided, on a face opposite the driven element (4), with ramps designed to work during an engagement phase with ramps supported by the driven element (4), whereby this engagement is obtained by axial movement of the driven element (4) on the shaft (1) in the direction in which the driven element (4) moves toward said clutch cover plate (6), whereby the axial movement is controlled by an actuating element with manual control, that can be moved angularly,
    wherein the actuating element is, unless there is control input from a driver, retracted to an inactive position corresponding to the disengaged position of the clutch mechanism and wherein there is provided, inserted between clutch cover plate (6) and driven element (4), a spring (9) that tends to retract the driven element (4) into a position away from the clutch cover plate (6) that corresponds to a disengaged position.

* * * * *